(12) United States Patent
Pressler et al.

(10) Patent No.: US 7,347,433 B2
(45) Date of Patent: Mar. 25, 2008

(54) WHEEL AND STEERING SENSOR SYSTEM

(75) Inventors: John F. Pressler, Bay City, MI (US); Brian D. Lemanski, Linwood, MI (US); Gordon D. Richardson, Midland, MI (US); Malcolm F. Ruppert, Jr., Caro, MI (US)

(73) Assignee: Delphi Technologies, Inc, Troy, MI (US)

( * ) Notice: Subject to any disclaimer, the term of this patent is extended or adjusted under 35 U.S.C. 154(b) by 312 days.

(21) Appl. No.: 10/902,365

(22) Filed: Jul. 29, 2004

(65) Prior Publication Data

US 2006/0022420 A1    Feb. 2, 2006

(51) Int. Cl.
*B60D 15/02* (2006.01)
(52) U.S. Cl. .................................................. 280/93.5
(58) Field of Classification Search ........... 280/93.512, 280/93.5, 93.511; 73/862.08, 862.191, 862.29, 73/862.31
See application file for complete search history.

(56) References Cited

U.S. PATENT DOCUMENTS

| 4,637,488 | A | 1/1987 | Fotheringham et al. ..... 180/253 |
| 6,293,022 | B1 | 9/2001 | Chino et al. ............. 33/203.18 |
| 6,494,471 | B2 | 12/2002 | Lukac ....................... 280/93.5 |
| 6,568,696 | B2 | 5/2003 | Osborn et al. ............ 280/93.5 |
| 6,721,629 | B2 | 4/2004 | Wendling et al. .......... 700/279 |
| 2003/0028288 | A1* | 2/2003 | Wendling et al. .......... 700/279 |
| 2003/0230449 | A1 | 12/2003 | Nelson et al. ............. 180/403 |

* cited by examiner

*Primary Examiner*—Paul A. Dickson
*Assistant Examiner*—Robert A. Coker
(74) *Attorney, Agent, or Firm*—Michael D. Smith

(57) ABSTRACT

A steerable element angular sensor system may include a sensor having a sensing axis positioned along an axis of rotation of a knuckle, a connector connecting a yoke and a knuckle of a steering system. The sensor may detect rotation of at least one of the knuckle and the connector. Also, the sensor system may include protection from rotation detection interference from linear and angular movements of at least one of the connector and the knuckle. The sensor system may be included within a steerable element assembly and provided within a vehicle.

11 Claims, 3 Drawing Sheets

WHEEL AND STEERING SENSOR SYSTEM

BACKGROUND

This invention relates generally to sensors usable in vehicular applications, and more particularly, this invention relates to a steerable wheel angle sensor and mount.

Wheel angle signals from a wheel angle sensor may be employed by electronic data management to fine-tune power steering parameters, making driving easier and more enjoyable. In some vehicles, the wheels may be independently supported and steerable, and it may be necessary to have coordinated steering angles between front and rear wheels. Computer controls are able to resolve signals indicating steer angle differences, and make adjustments to the steering system as necessary, or, alternatively, provide different angles of certain wheels for various purposes.

In one prior system of measuring wheel angle in a vehicle, a power steering apparatus is provided with a steering shaft, which is rotated by manipulation of a steering wheel, and a valve unit coupled to the steering shaft. The valve unit supplies and drains hydraulic oil to and from a cylinder in accordance with rotation of the steering shaft. The cylinder has a pair of piston rods protruding from its sides and coupled to a vehicle wheel. The moving amount of the piston rods is detected by a stroke sensor, which is expensive. The angle of the wheels is computed based on the value detected by the stroke sensor, which complicates the computation of the wheel angle.

In another prior system of measuring wheel angle in a vehicle, linear movement of piston rods is converted into rotation by a converter, such as a link mechanism, and is detected by a potentiometer. The angle of the steered wheels is detected based on the value detected by the potentiometer. The use of a converter increases the number of parts and complicates the installation of the apparatus. If the converter is not assembled accurately, the detection of the wheel angle will be inaccurate.

Current wheel angle sensors for electric power steering systems, which eliminate the need for the power steering pump and hydraulic fluid, and four wheel steering systems measure the pinion angle or the rack position. In one example, the sensor is positioned at the bottom of the actuator and additional costs are associated with protecting the sensor from ground clearance and jacking issues.

One problem with measuring a steered wheel angle is that the wheels and the steered wheel axis are potentially subject to harsh environmental conditions. This makes locating measurement systems or sensors difficult. Environmental conditions such as dirt or water can adversely impact the accuracy of sensor measurements or damage sensors. Prior wheel angle sensors, which are located so as to be protected from environmental damage, have been difficult to reach for maintenance and repair purposes.

BRIEF SUMMARY

Disclosed herein, in an exemplary embodiment, is a steerable element angular sensor system including a sensor having a sensing axis, the sensing axis positioned along an axis of rotation of a knuckle, a connector connecting a yoke and the knuckle of a steering system. The sensor detects rotation of at least one of the knuckle and the connector and the sensor system includes protection from rotation detection interference from linear and angular movements of at least one of the connector and the knuckle.

Also disclosed herein, in another exemplary embodiment, is a steerable element assembly including a first housing element including a steering knuckle movable in response to a steering system, a second housing element, a connector connecting the steering knuckle to the second housing element, and a sensor having a sensing axis, the sensing axis positioned along an axis of rotation of the knuckle. The sensor detects rotation of at least one of the knuckle and the connector and the sensor system includes protection from rotation detection interference from linear and angular movements of at least one of the connector and the knuckle.

Further disclosed herein, in yet another exemplary embodiment, is a vehicle including a set of steerable elements, a steering system for steering the steerable elements, an electronic control unit for receiving first signals and for sending second signals in response to the first signals to at least one steering assist motor within the vehicle, an angular sensor provided adjacent each steerable element for providing steerable element angle signals to the electronic control unit, wherein each angular sensor is positioned at a steerable element end.

BRIEF DESCRIPTION OF THE DRAWINGS

The embodiments will now be described, by way of an example, with references to the accompanying drawings, wherein like elements are numbered alike in the several figures in which.

DETAILED DESCRIPTION OF EXEMPLARY EMBODIMENTS

The wheel angle sensors and mounts disclosed herein may sense the position of the wheel end directly. Placing a sensor at each wheel end adds a layer of diagnostics to the overall system by allowing the controller(s) to know the angle of the wheel regardless of the state of health of the tie rods, tie rod ends, rack or anything else that is between the sensor and the wheel end. This may be best accomplished with one sensor at each wheel end. A side benefit of having a sensor at each wheel end is true redundancy of the sensor signal. In addition, the position at the wheel end increases accuracy by eliminating the lash and compliance of components that are bypassed.

The wheel angle sensor may be a rotary type of any suitable technology (i.e. contacting, non-contacting) for a particular application. Rotary sensors may be designed to convert rotary motion into an electrical signal. A linear output voltage is directly proportional to the angle of rotation of the sensor. Although a rotary sensor is described, other types of sensors may be within the scope of these embodiments.

Figure 1:
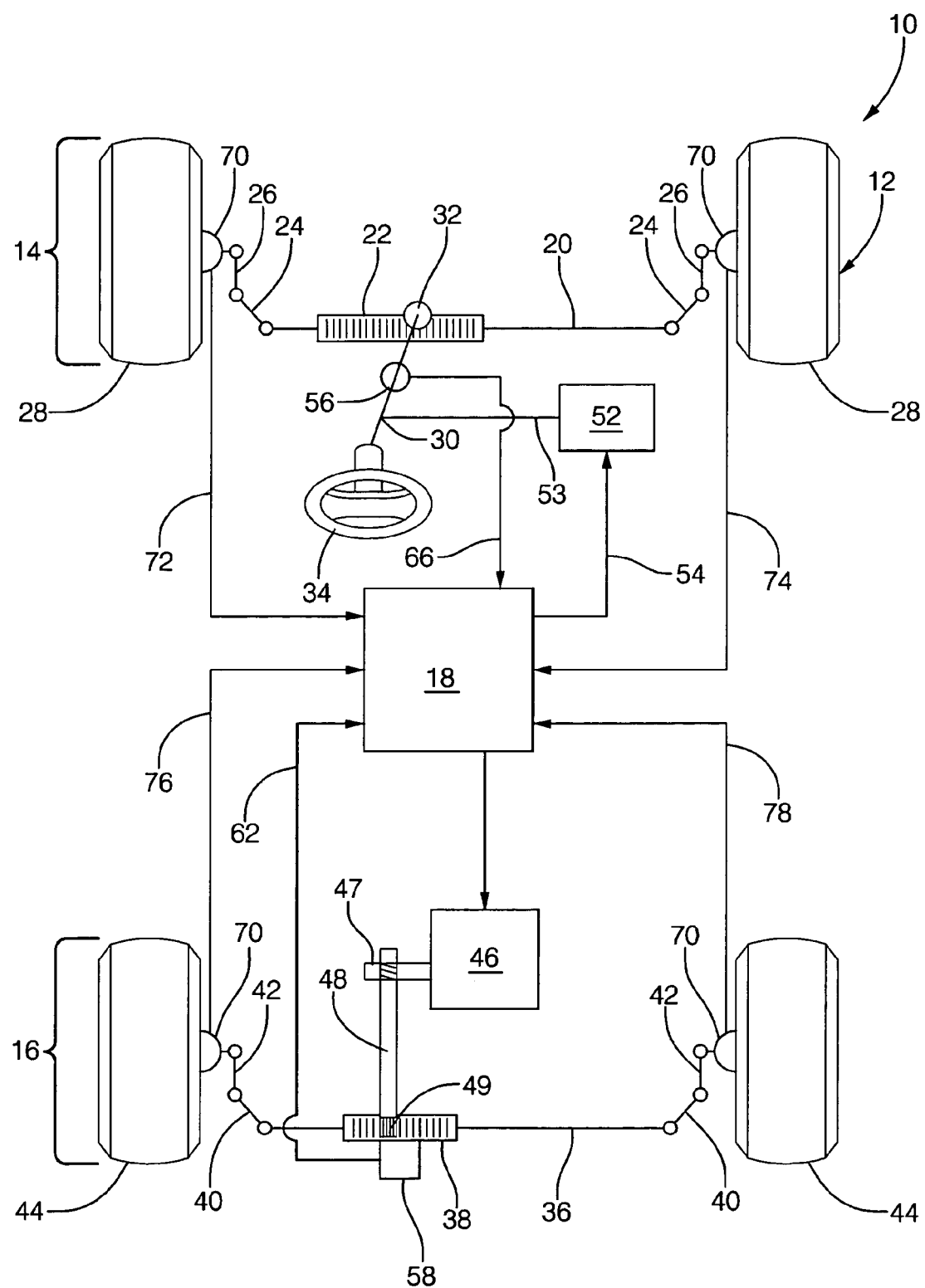
FIG. 1 is a schematic representation of a motor vehicle including front and rear steerable wheels.

Turning now to FIG. 1, a partial depiction of an exemplary vehicle control system 10 is shown. It should be understood that the system 10 is only one example where the embodiments of a wheel angle sensor and mount may be employed, and that the embodiments of a wheel angle sensor and mount disclosed herein may be employed in any suitable vehicle control system. The embodiments of a wheel angle sensor and mount may be used in such systems including, but not limited to, electric power steering, four wheel steering systems, steer by wire systems, etc.

System 10 is incorporable into a motor vehicle 12 to provide directional control to motor vehicle 12 and is configurable to enhance steering of the motor vehicle 12. System 10 comprises a front steering mechanism, shown generally at 14, a rear steering mechanism, shown generally at 16, and a controller 18 in communication with front steering mechanism 14 and rear steering mechanism 16. Although system 10 is shown as being applicable to a rack and pinion steering arrangement, system 10 may be incorporable into other steering arrangements.

Front steering mechanism 14 comprises a rack shaft 20, a front steering rack 22 disposed intermediate opposing ends of rack shaft 20, a tie rod 24 disposed on each opposing end of rack shaft 20, a knuckle arm 26 connected to each tie rod 24, and a front steerable wheel 28 rotatably disposed on each knuckle arm 26. Rack shaft 20, tie rods 24, and knuckle arms 26 may be configured such that front steerable wheels 28 may pivot in unison relative to a body of motor vehicle 12 to steer or to effect a change in the direction of travel of motor vehicle 12 while motor vehicle 12 is moving. Of course, the wheels may also pivot when the vehicle 12 is not traveling. Alternatively, there may be some embodiments of a motor vehicle 12 where the right and left wheels are independently controlled such that they do not pivot in unison relative to the body of the motor vehicle 12.

Front steering mechanism 14 may further include a mechanism through which an operator can effectuate a desired change in the direction of travel of motor vehicle 12. Such a mechanism may include a steering shaft 30 disposed in operable communication at one end thereof with front steering rack 22 through a pinion 32 and at an opposing end thereof with a steering device 34, such as a hand steering wheel. Manipulation of steering device 34, e.g., rotation of the hand steering wheel, causes the axial rotation of steering shaft 30, which in turn causes the rotation of pinion 32. Rotation of pinion 32, through the engagement of front steering rack 22 and pinion 32, effectuates the lateral translation of front steering rack 22 relative to the body of motor vehicle 12. The lateral translation of front steering rack 22 causes front steerable wheels 28 to angle relative to the body of motor vehicle 12, thereby altering the direction of travel of motor vehicle 12 while motor vehicle 12 is moving, or even while the vehicle is otherwise not traveling.

Rear steering mechanism 16 may include a rack shaft 36, a rear steering rack 38 disposed intermediate opposing ends of rack shaft 36, a tie rod 40 disposed on each opposing end of rack shaft 36, a knuckle arm 42 connected to each tie rod 40, and a rear steerable wheel 44 rotatably disposed on each knuckle arm 42. Rack shaft 36, tie rods 40, and knuckle arms 42 are configured such that rear steerable wheels 44, like front steerable wheels 28, may be pivoted in unison relative to the body of motor vehicle 12 to steer motor vehicle 12 upon lateral translation of rear steering rack 38.

Rear steering mechanism 16 may further include a mechanism through which rear steerable wheels 44 can similarly be pivoted. Such a mechanism may include a motor 46 operably connected to rear steering rack 38 through a drive mechanism 48. Drive mechanism 48, through a pinion 49, may transfer the rotational motion of a rotor shaft 47 of motor 46 to linear motion of rear steering rack 38, which effectuates the lateral motion of rack shaft 36 and, ultimately, the pivoting of rear steerable wheels 44. Accordingly, a displacement sensor 58 may be used to detect the displacement of rear rack shaft 36, and hence determine the rear steering angle for feedback to the controller 18. In an alternate system 10, the rear wheel steering mechanism, which includes the motor 46, drive mechanism 48, and pinion 49 need not be included.

Additionally, or in another embodiment of the system 10, the front steering mechanism 14 may include a motor 52 which is in mechanical communication with the steering shaft 30. The mechanical communication link 53 may include a worm and a worm gear where the motor 52 rotates the worm and the worm gear which provides turning assistance to the steering shaft 30. The motor 52 may begin operation when in receipt of a signal 54 from the controller 18. In yet another embodiment, the motor 52 may be provided in mechanical communication with the pinion 32 or the steering rack 22 instead of with the steering shaft 30, although the signal 54 may remain the same in such an embodiment.

Motor vehicle 12 may further be provided with a steering angle sensor 56 for detecting an angular position of steering column 30, and which transmits to controller 18 a handwheel position signal 66 indicative of a handwheel angle. Similarly, a torque sensor may be located on the steering shaft for detecting the rotation force of the hand wheel 34 transmitted to the steering shaft. The torque sensor may measure the torque applied to the steering shaft and send a signal to the controller 18. The controller 18 may use information from sensors, such as the torque sensor and/or position sensor 56 to determine if the signal 54 should be sent to the motor 52 to begin operation of the motor 52 for providing turning assistance to the steering shaft.

A rear rack shaft displacement sensor 58 may detect the displacement of its corresponding rack shaft 36 from a reference position, which is the position in which each rear steerable wheel 44 is aligned and rotatable and transmits a rear wheel angle signal 62 to controller 18. The handwheel position signal 66 and the rear wheel angle signal 62 may be derived from a variety of sources including, but not be limited to, various encoders, other position sensors such as potentiometers, synchros, resolvers, magnetic and optical transducers, and the like, including combinations of the foregoing.

In lieu of the rear rack shaft displacement sensor 58, or, alternatively, in addition to the rear rack shaft displacement sensor 58, the system 10 may include one or more wheel angle sensors 70. Although a wheel angle sensor 70 is shown for each of the four wheels shown in the vehicle 12, it should be understood that, in an alternate embodiment, only a subset of the four wheels may be provided with a wheel angle sensor 70. In yet another embodiment, the vehicle 12 may include more or less wheels than the four wheel system shown in FIG. 1, and any number of the wheels in such an embodiment may be provided with a wheel angle sensor 70. Each of the wheel angle sensor 70 preferably sends a signal relating to wheel angle position of its associated wheel, as demonstrated by signals 72, 74, 76, and 78, to the controller 18.

Controller 18 is disposed in communication with the various systems of motor vehicle 12. Controller 18 receives informational signals from each of the systems, quantifies the received information, and provides an output command signal in response thereto, in this instance, for example, to the rear steering mechanism 16 through motor 46 and/or to the front steering mechanism 14 through motor 52.

Figure 2:
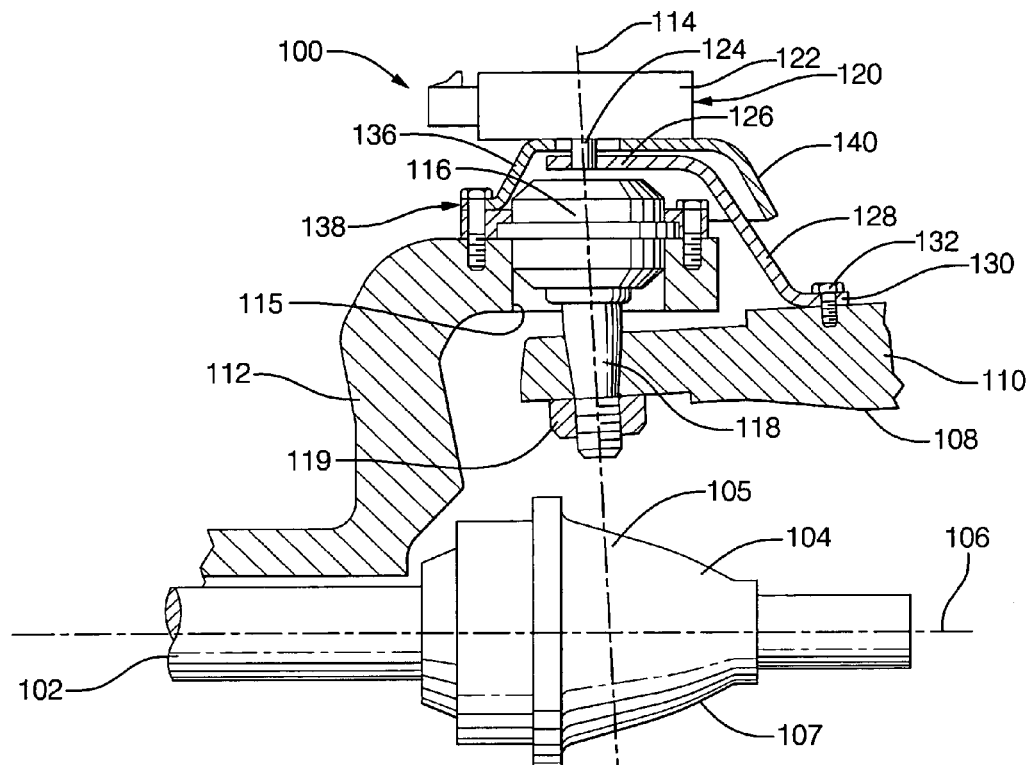
FIG. 2 is a cross-sectional view of a portion of a steering assembly including a wheel angle sensor.

Turning now to FIG. 2, a wheel angle sensor system 100, usable, for example, as the wheel angle sensor 70 within FIG. 1, is shown. A drive shaft 102 may provide a drive shaft for driving a wheel (not shown) of a vehicle. While a drive shaft 102 is shown, it should be understood that the wheel end design may or may not have a drive shaft present. The main function for the wheel end is to provide the knuckle with the ability to rotate and/or to steer, and thus the use of a drive shaft is independent. The drive shaft being present or absent will have no effect on the sensor system 100, that is, the sensor system 100 will still be functional as long as the knuckle turns relative to the yoke. The wheel may be connected to connector 104 via a hub (not shown). That is, a wheel may be connected to a hub, which in turn may be connected to the connector 104. The connector 104 may be a universal joint, a constant velocity joint, or another suitable joint for connecting to a hub of the wheel. The wheel is connected to the hub and connector 104 for rotation with the drive shaft 102 about the drive shaft longitudinal axis 106. The wheel is permitted to be steered (i.e., angled) through its support on a steerable wheel housing 108 that may include a steerable steering knuckle 110 pivotal with respect to a fixed yoke 112. The steering knuckle 110 may be connected to a drag link of a steering system. For example, the knuckle arms 26 of FIG. 1 are connected to tie rods 24 on each end of rack shaft 20. The steering knuckle 110 may rotate about an axis of rotation 114 for steering the wheel in the desired direction. The axis of rotation 114 is also the center of rotation for the wheel end. The steering knuckle 110 may be connected to the yoke 112 via a ball joint 115 containing an upper ball stud 116. The ball joint 115 and ball stud 116 thus form a connector between the steering knuckle 110 and the yoke 112. It should be understood that the yoke 112 may cylindrically surround the drive shaft 102 and may fork out to surround the connector 104 on upper and lower sides 105, 107 of the connector 104. Likewise, the steering knuckle 110 may fork out about upper and lower sides 105, 107 of the connector 104. While only one ball stud 116 is shown, it should be understood that an additional ball stud 116, a lower ball stud, may be provided below the connector 104 for connecting another arm of the steering knuckle 110 to another arm of the yoke 112. A lower ball stud 116 would be the ball stud closer to the ground that a vehicle wheel rests upon than an upper ball stud 116. An arm portion 118 of the ball stud 116 may extend through a portion of the knuckle 110, and may be secured thereto with nut 119.

The wheel angle sensor system 100 may include a sensor 120 having a housing 122 that may be mounted above an upper ball stud 116. This point is above the ball stud where the center of articulation of the knuckle 110 occurs. This mounting position allows for easy access for maintenance as well as good positional reference. With respect to a ground surface where the wheels of a vehicle make contact, the upper ball stud 116 is that ball stud 116 which is furthest away from the ground surface. The sensor 120 may include a rotatable sensor shaft 124 that extends toward the ball stud 116 and shares a longitudinal axis with the ball stud 116 about an axis of rotation. The sensor shaft 124 thus forms a sensing axis for the sensor 120. The sensor shaft 124 is attached to a first end portion 126 of a sensor arm 128. The sensor housing 122 and bracket 136 may be stationary with respect to rotation of the sensor shaft 124, just as the yoke 112 may be stationary with respect to movement of the knuckle 110 and sensor shaft 124. A second end portion 130 of the sensor arm 128 may extend out to a fixed point on the knuckle 110. There may be a lash free attachment feature 132 that allows the sensor arm 128, which is attached to the shaft 124 of the sensor 120, to move with the knuckle 110.

The lash free attachment feature may be any attachment assembly that does not allow lash or a considerable amount of lash, but does allow movement in certain planes, such as, but not limited to, a bolt with rubber washer, a pin with spring retention, a rubber mount, ball socket and assembly, etc. The sensor arm 128 may travel in an arc with the knuckle 110 about the axis of rotation 114, thus tracing the movement of the wheel end directly.

The sensor housing 122 may be connected to a sensor bracket 136 that may in turn be connected to the ball joint 115, or to a portion directly associated with the ball joint 115. It should be understood that the ball joint 115 includes a stationary portion that is mounted to the stationary yoke 112, and a movable portion that is the ball stud 116. In one embodiment, a ball stud seal may be provided with features that would allow easy attachment of the sensor bracket 136 via a sensor bracket attachment feature 138. The sensor bracket 136 may further be provided with a sensor arm protector 140 that may help protect the sensor arm 128 from foreign objects. The sensor arm protector 140 may include a flange wide enough to cover the sensor arm 128 at any position during its potential travel path with the knuckle 110.

Figure 3:
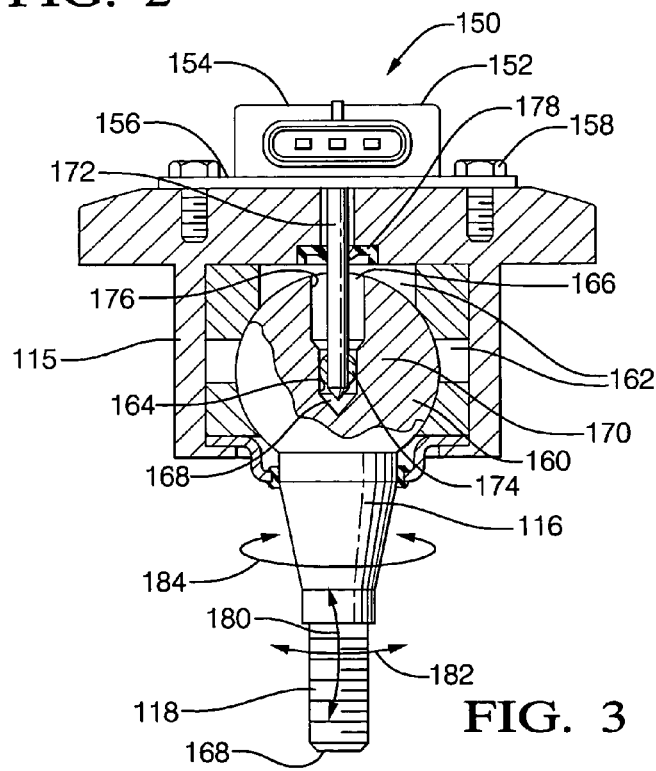
FIG. 3 is a cross-sectional view of a portion of an alternative steering assembly including a wheel angle sensor; and, FIG. 4 is a cross-sectional view of a portion of another alternative steering assembly including a wheel angle sensor.

As shown in FIG. 3, a wheel angle sensor system 150 may be utilized with a steerable wheel housing 108 that may include a steerable steering knuckle 110 pivotal with respect to a fixed yoke 112 as shown in FIG. 2. Also as in FIG. 2, the steering knuckle 110 is connected to the yoke 112 with at least one ball stud 116, with the sensor 152 of the wheel angle sensor system 150 positioned above the upper ball stud 116, where the upper ball stud is the ball stud furthest away from the ground that the vehicle rests upon. Thus, the ball joint 115 and its ball stud 116 form a connector between the yoke 112 and the knuckle 110. The sensor 152 may include a sensor housing 154 connected to the ball joint 115 via a sensor bracket 156 using a sensor bracket attachment feature 158, such as, but not limited to, a bolt. The ball joint 115 includes a stationary portion that is fixed to the stationary yoke 112 and a movable portion which is the ball stud 116. The ball stud 116 may include an arm portion 118 which passes through a portion of the knuckle 110, and also includes a ball portion 160 which may be supported within a ball seat, a stationary portion, of the ball joint 115 and which may be surrounded by grease packed cavities 162 for fluent movement within the ball joint 115.

The ball portion 160 may include a bore 164 that starts at a top radius of the ball portion 160, that is, at a first end 166 of the ball stud 116, where the first end 166 is located on the ball portion 160, and a second end 168 is opposite the first end 166 and is located on the arm portion 118. The bore 164 may continue from the first end 166 to a central portion 170 of the ball portion 160. The center of articulation of the ball stud 116 occurs at the central portion 170. That is, the ball stud 116 moves about in the directions shown by arrows 180, 182, in addition to rotation about its longitudinal axis as shown by arrow 184.

The shaft 172 of the sensor 152 has a longitudinal axis that shares an axis of rotation with the knuckle 110, as previously described with respect to FIG. 2. The shaft 172 forms a sensing axis for the sensor 152. The shaft 172 may pass through the ball joint 115 into the bore 164 of the ball portion 160 in the ball stud 116, which is the center of rotation for the wheel end. Thus, the sensor shaft 172 is designed to penetrate the core of the upper ball stud 116 on the wheel end. There may be a lash free attachment feature 174 positioned between the ball stud 116 and the sensor shaft 172. The lash free attachment feature 174 may be an O-ring, a donut shaped rubber piece, a spring-loaded attachment, etc. Also, the bore 164 may have a large enough radius, including at the top portion 176 of the bore 164, to allow the movement of the ball stud 116 while the sensor shaft 172 is held radially static. That is, the ball stud 116 may be capable of moving in angular directions, such as shown by arrows 180 and 182 which does not relate to rotation of the sensor shaft 172. During such movements of the ball stud 116, the bore 164 of the ball portion 160 must have enough clearance for movement without interfering with the sensor shaft 172. When the ball stud 116 rotates, as shown by arrow 184, then the attachment feature 174 translates the rotation to the sensor shaft 172 and the sensor 152 senses such rotation which is indicative of wheel angle changes. Thus, this embodiment includes a drive mechanism created by an interference fit between the sensor shaft 172 and the attachment feature 174, such as a drive disc, and between the attachment feature 174, e.g. drive disc, and the ball stud 116. This interference allows for the shaft to handle linear displacements along the shaft axis, and allows for positional inaccuracies between the sensor shaft 172 and the ball stud 116 without angular error to the sensor 152. In addition, because of the attachment feature 174, such as a flexible coupling, there is a diametral difference between the sensor shaft 172 and the bore 164 which enables the handling of any angular deflection of the ball stud 116 that may result from service loads.

The sensor system 150 may further be provided with a grease seal 178 added to angle encoder. This may be useful when a grease packed ball stud 116 is used. Since the bore 164 penetrates the grease packed ball joint, a grease seal 178 may be used for maintaining the grease and keeping the joint sealed.

Figure 4:
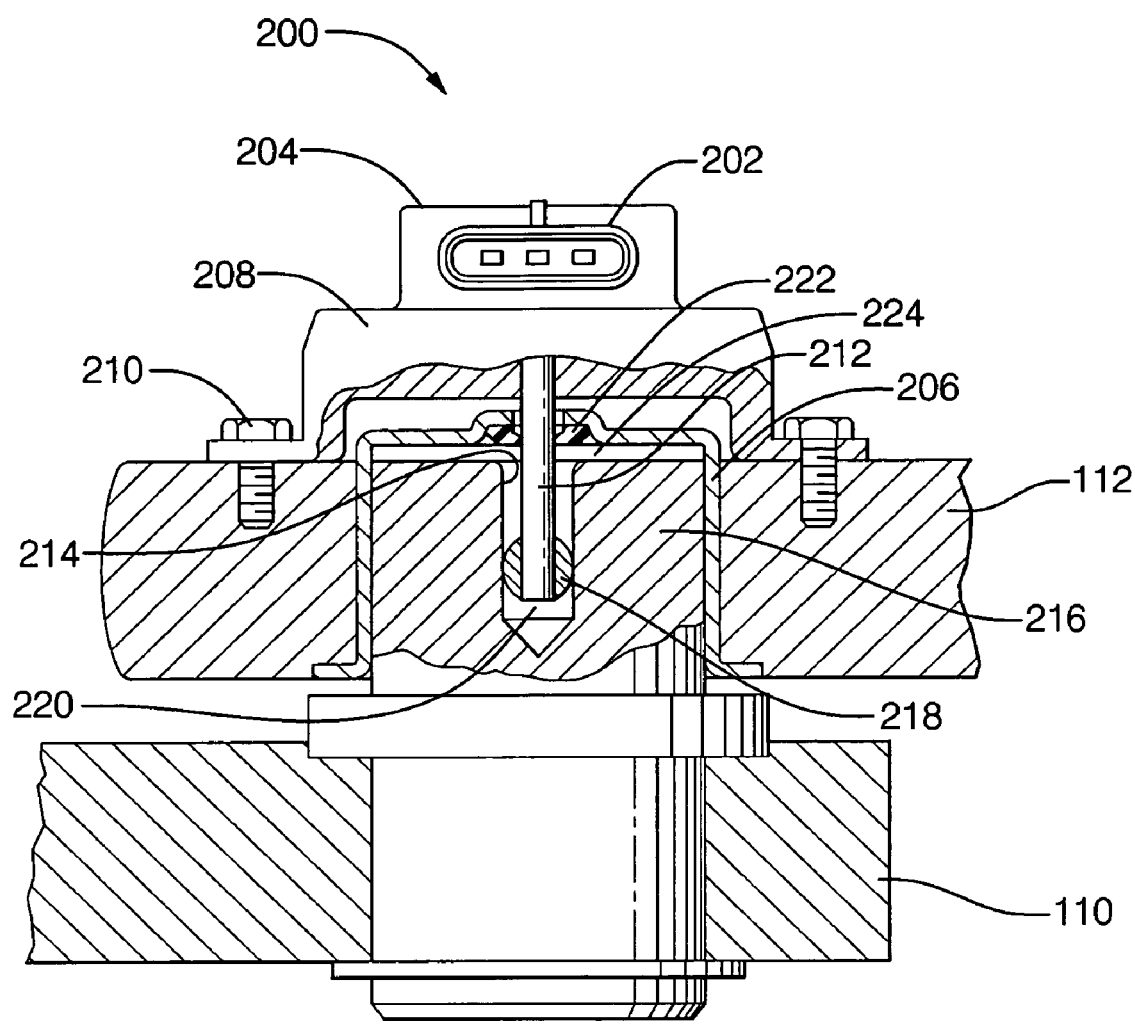

Turning now to FIG. 4, a wheel angle sensor system 200 includes a sensor 202 having a housing 204 which attaches to a yoke 112 via a mounting bracket 208 using a bracket attachment feature 210 such as, but not limited to, bolts. A shaft 212 of the sensor 202 may pass through a bore 214 in a knuckle pin 216 when a pin and bushing design is used to replace a ball stud assembly as previously shown in FIGS. 2 and 3. The shaft 212 forms a sensing axis for the sensor 202 and the pin and bushing form a connector between the knuckle 110 and the yoke 112. A bushing 206 may be positioned as a bearing between the knuckle pin 216 and the yoke 112. With a knuckle pin concept, the sensor shaft 212 may pass through the bore 214 in the center 220 of the pin diameter. There may be a lash free attachment feature 218 that may allow the knuckle pin 216 to move axially in the direction on the attachment feature 218. The attachment feature 218 may be an O-ring, a donut shaped rubber piece, a spring-loaded attachment, etc. Rotation of the knuckle pin 216 is translated to rotation of the sensor shaft 212 through the attachment feature 218. Thus, this embodiment includes a drive mechanism created by an interference fit between the sensor shaft 212 and the attachment feature 218, such as a drive disc, and between the attachment feature 218, e.g. drive disc, and the knuckle pin 216. This interference allows for the shaft to handle linear displacements along the shaft axis, and allows for positional inaccuracies between the sensor shaft 212 and the knuckle pin 216 without angular error to the sensor 202. In addition, because of the attachment feature 218, such as a flexible coupling, there is a diametral difference between the sensor shaft 212 and the bore 214 which enables the handling of any angular deflection of the knuckle pin 216 that may result from service loads.

There may further be a seal 222 on angle encoder and a grease pack area 224 as shown. The seal 222 may retain the grease within the grease pack area 224, which may otherwise escape through the opening within the bushing 206 which allows the sensor shaft 212 to pass into the bore 214.

In another embodiment, a curved sensor, such as, for example, a horse-shoe shaped sensor or other sensor partially circumscribing the connector, may surround the arm portion 118 of the ball stud 116 or the knuckle pin 216 between the yoke 112 and the knuckle 110, and may sense rotation of the ball stud 116 or knuckle pin 216 yet may still be protected from environmental problems. Thus, instead of a sensor shaft which is positioned directly along the rotational axis, a curved sensor which at least partially surrounds the knuckle pin 216 or ball stud 116 may be provided wherein the curved sensor has a sensing axis which is positioned directly along the rotational axis of the knuckle pin 110 and the connector. In such an embodiment, a line projected perpendicular to the tangent on a theoretical "horseshoe" or semi-circular device may lead to a center of rotation for the sensor occuring at the center of the rotational axis of the knuckle pin 216 or ball stud 116. Thus, a sensing axis would be formed by such a sensor which follows the rotational axis of the knuckle 110 and the connector for the particular embodiment, such as, but not limited to, a ball stud 116 or knuckle pin 216.

Thus, wheel angle sensor systems have been described wherein the sensor attachment is designed to allow the sensor to be attached to an optimal point on the wheel end for positional reference. Another feature of this position is that packaging above the wheel end allows for good protection from foreign material such as sticks or rocks from damaging the sensor. It also raises the sensor to lessen the water dunk severity. Additionally, the location provides easy access for maintenance or replacement purposes.

While the invention has been described with reference to an exemplary embodiment, it will be understood by those skilled in the art that various changes may be made and equivalents may be substituted for elements thereof without departing from the scope of the invention. Terms such as "first" and "second" are used herein merely to distinguish between two like elements, and are not intended to imply an order such as of importance or location. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A steerable element angular sensor system comprising:
   a sensor comprising a sensor shaft having a sensing axis, the sensing axis positioned along an axis of rotation of a knuckle,
   a connector connecting a yoke and the knuckle of a steering system; and
   a sensor arm having a first end attached to the sensor shaft and having a second end for connecting to the knuckle, wherein the sensor arm traces movement of the knuckle about the axis of rotation of the knuckle;
   wherein the sensor detects rotation of at least one of the knuckle and the connector and wherein the sensor system includes protection from rotation detection interference from linear and angular movements of at least one of the connector and the knuckle.

2. The steerable element angular sensor system of claim 1 wherein the sensor is provided in a sensor housing positioned on an element stationary with respect to rotation of the connector.

3. The steerable element angular sensor system of claim 1 further comprising a lash free attachment device for attaching the sensor arm to the knuckle.

4. The steerable element angular sensor system of claim 1 further comprising a sensor arm protector for protecting the sensor arm from foreign material.

5. The steerable element angular sensor system of claim 4 wherein the sensor arm protector is attached to a stationary bracket.

6. A steerable element assembly comprising:
a wheel housing element including a steering knuckle movable in response to a steering system;
a yoke;
a connector connecting the steering knuckle to the yoke;
a sensor having a sensing axis, the sensing axis positioned along an axis of rotation of the knuckle, said sensor including a sensor shaft lying along the sensing axis; and
a sensor arm attached at a first end to the sensor shaft and connected at a second end to the knuckle, wherein the sensor arm traces movement of the knuckle about the axis of rotation of the knuckle;
wherein the sensor detects rotation of at least one of the knuckle and the connector and wherein the sensor system includes protection from rotation detection interference from linear and angular movements of at least one of the connector and the knuckle.

7. The steerable element assembly of claim 6 wherein the sensor is provided in a sensor housing positioned on an element stationary with respect to rotation of the connector.

8. The steerable element assembly of claim 6 further comprising a lash free attachment device for attaching the sensor arm to the knuckle.

9. The steerable element assembly of claim 8 wherein the lash free attachment device is a flexible coupling.

10. The steerable element assembly of claim 6 further comprising a sensor arm protector for protecting the sensor arm from foreign material.

11. The steerable element assembly of claim 10 wherein the sensor arm protector is attached to a stationary bracket connected to a sensor housing for the sensor.

* * * * *